United States Patent [19]

Jones et al.

[11] 3,893,429
[45] July 8, 1975

[54] STRATIFIED CHARGE ROTARY ENGINE WITH CARBURETOR FUEL CONTROL

[75] Inventors: Charles Jones, Hillsdale, N.J.;

[73] Assignee: Curtiss-Wright Corporation, 02, Wood-Ridge, N.J.

[22] Filed: Dec. 12, 1973

[21] Appl. No.: 426,663

[52] U.S. Cl.............................. 123/8.13; 123/8.45
[51] Int. Cl........................................... F02b 53/04
[58] Field of Search................... 123/8.13, 8.09.8.45

[56] References Cited
UNITED STATES PATENTS

| | | | |
|---|---|---|---|
| 3,698,364 | 10/1972 | Jones | 123/8.09 |
| 3,766,893 | 10/1973 | Tredway et al. | 123/8.09 |
| 3,780,707 | 12/1973 | Cole | 123/8.13 |
| 3,827,408 | 9/1974 | Ishikawa | 123/8.13 |

Primary Examiner—C. J. Husar
Assistant Examiner—O. T. Sessions
Attorney, Agent, or Firm—Victor D. Behn; Arthur Frederick

[57] ABSTRACT

A rotary combustion engine designed for operation as a stratified-charge engine by providing the engine with two intake passages, one an unthrottled passage for air only and the other for a very-rich, carburetor-controlled, fuel-air mixture such that the over-all charge is relatively lean. The two intake passages are arranged so that the fuel-rich mixture occupies the trailing portion of each engine working chamber when the mixture in the chamber is ignited and the spark plug for initiating combustion is disposed so that it fires in this fuel-rich region.

5 Claims, 4 Drawing Figures

STRATIFIED CHARGE ROTARY ENGINE WITH CARBURETOR FUEL CONTROL

BACKGROUND OF THE INVENTION

The invention relates to rotary internal combustion engines of the type disclosed in prior U.S. Pat. No. 2,988,065 and particularly to such an engine designed for operation as a stratified charge engine. Prior stratified charge rotary combustion engines are disclosed in U.S. Pat. Nos. 3,246,636 and 3,698,364.

The problem of pollution resulting from the exhaust emissions discharged by internal combustion engines is well recognized today. One of the approaches for minimizing this problem is to design the engine for operation with a stratified charge. By stratified charge operation is meant that the fuel-air mixture or charge in each engine combustion chamber is not a uniform mixture and instead has at least one region where the fuel-air mixture is relatively rich. Combustion is initiated in this relatively fuel-rich mixture and this combustion is relied upon to ignite the fuel in the relatively fuel-lean region. Such use of a stratified charge type of cycle has the beneficial effect that the engine can be operated with a leaner over-all fuel-air ratio than is possible with an engine having a uniform fuel-air mixture. Compared to engine operation at approximately a stoichiometric fuel-air ratio, engine operation on a leaner fuel-air ratio results in a significant reduction of both the oxides of nitrogen (NOx) and the carbon monoxide in the engine exhaust and generally in some reduction in the hydrocarbons and also results in lower fuel consumption.

Difficulty, however, has been experienced in operating the rotary combustion engine configuration disclosed in U.S. Pat. Nos. 3,246,636 and 3,698,364 over the entire operating range with completely acceptable firing regularity and without to some extent sacrificing engine performance. This is particularly true at low power and idling conditions. Also both of these prior patents require the use of high pressure fuel injection systems to achieve a stratified charge. Such high pressure fuel injection systems are relatively costly as compared to carburetor or other low pressure fuel injection systems.

SUMMARY

Accordingly, it is an object of this invention to provide a new and improved rotary combustion engine designed for operation on a stratified charge so that the engine can be operated on a lean over-all fuel-air ratio throughout the operating range of the engine.

Another object of the invention is to provide a rotary combustion engine having a new and improved charge intake system so that fuel is supplied into the engine working chambers during the intake phase of each chamber in such a manner as to provide a highly stratified charge in each chamber.

A still further object of the invention is to provide a new and improved stratified charge rotary combustion engine in which the charge intake system of the engine is designed to provide a rich fuel mixture at the trailing portion of each working chamber and in which engine spark plug or plugs are positioned so that combustion is initiated in each working chamber in its fuel-rich region.

In accordance with the preferred embodiment of the invention, a rotary engine is provided with a pair of intake ports, one for supplying air only and the other for supplying a rich mixture of fuel and air. These intake ports are positioned so that the rich fuel-air mixture is supplied primarily at the end portion of the intake stroke of each working chamber so that the trailing portion of each working chamber becomes relatively fuel-rich. In addition, the engine spark plug is positioned so that combustion in each engine working chamber is initiated in its fuel-rich trailing portion. This rotary combustion engine configuration not only provides a new and improved stratified charge rotary combustion engine but also eliminates the need for the relatively costly high pressure fuel injection nozzles of the aforementioned prior stratified charge patents.

Other objects of the invention become apparent upon reading the following detailed description in connection with the drawings.

DESCRIPTION OF PREFERRED EMBODIMENTS

Figure 1:
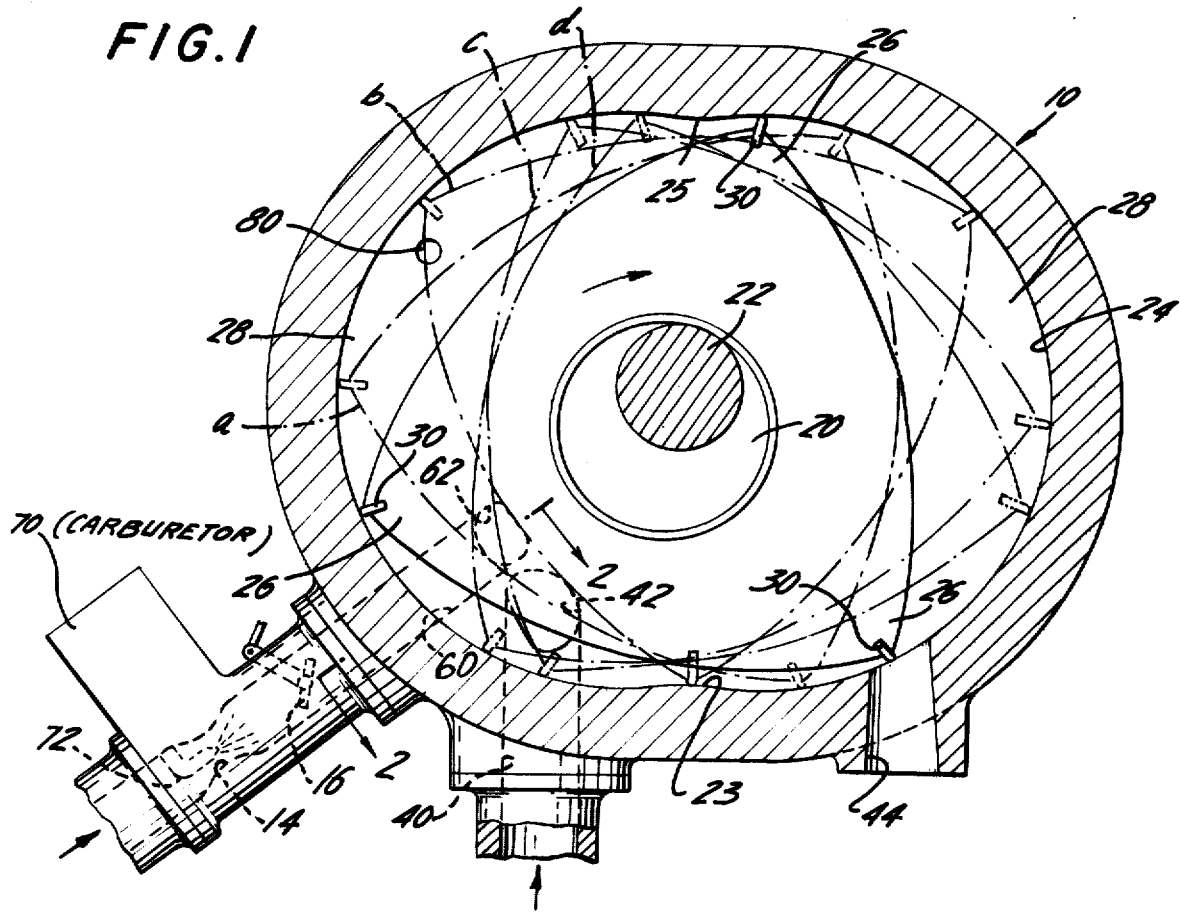
FIG. 1 is a schematic transverse sectional view of a rotary combustion engine embodying the invention.
Figure 2:
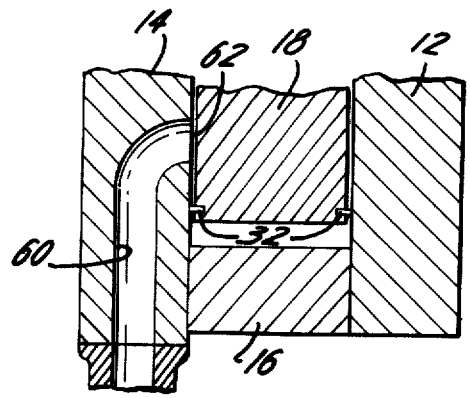
FIG. 2 is a sectional view taken along line 2—2 of FIG. 1.

Referring to the drawing, particularly to FIGS. 1 and 2, a rotating combustion engine is schematically indicated at 10, the engine being generally similar to the type disclosed in said aforementioned prior patents. The engine 10 comprises an outer body or housing consisting of two axially spaced end housings 12 and 14 and an intermediate or rotor housing 16, the housings being secured together to form the engine cavity therebetween. An inner body or rotor 18 is journaled for rotation within said housing cavity on an eccentric portion 20 of a shaft 22 which extends coaxially through and is supported by bearings (not shown) in the end housings 12 and 14. The axis of the shaft 22 is perpendicular to the inner walls of the end housings 12 and 14.

The peripheral inner surface 24 of the intermediate housing 16 is illustrated as having a two-lobe profile which preferably is basically an epitrochoid, said two lobes joining at junctions 23 and 25. The rotor 18 has a generally triangular profile with apex portions 26 having sealing cooperation with the trochoidal surface 24 to form three engine working chambers 28 between the rotor and the housings 12, 14 and 16. For this purpose, each of the rotor apex portions is provided with a seal 30 which extends across the rotor between the inner walls of the end housings 12 14 and the rotor also has suitable seals 32 on its end face for sealing contact with said end housing inner walls. Each of the three peripheral surfaces of the rotor preferably is provided with a trough-like recess 34, (see FIGS. 3 and 4).

The engine 10 also includes suitable gearing (not illustrated) between the rotor 18 and the engine housing to control the relative rotation of the rotor; such gearing is conventional and preferably is similar to that illustrated in the aforementioned prior patents.

An air intake passage 40 supplies air to an air intake port 42 disposed adjacent to and at one side of the junction 23 of the two lobes of the trochoidal peripheral surface 24. Said air intake passage 40 extends through the housing end wall 14 and the port 42 opens through the inner wall of this end housing 14. An exhaust port 44 is formed in the intermediate housing 16 adjacent to and on the opposite side of said junction 23. The engine combustion is initiated in the engine working chambers 28 in the vicinity of the other junction 25 of the two lobes of trochoidal surface 24.

The engine structure so far described is conventional and is generally similar to that illustrated in the aforementioned prior patents. Reference is made to said prior patents for further details of such an engine including, for example, details of the rotor seals and the gearing between the rotor and housing. With such an engine, during engine operation and with the rotor rotating clockwise as viewed in FIG. 1, the volume of each working chamber 28 periodically increases from a minimum volume condition, when it is located adjacent to the lobe junction 23 and opens the intake port 42, to a maximum volume condition and closes the intake port and then said chamber decreases in volume to compress its intake charge until the working chamber again reaches a minimum volume condition, but this time at the lobe junction 25. Thereafter, the volume of said chamber again increases to a maximum and then decreases to a minimum as the chamber comes into communication with the exhaust port at the lobe junction 23 to complete the cycle.

In addition to the air intake passage 40, the engine 10 includes a second intake passage 60 for supplying the working chambers with a fuel-air mixture. As illustrated in FIG. 2, the fuel-air mixture passage 60 is in the end housing 14 and opens through the inner wall of this end housing via a port 62. As already stated, the air intake passage 40 and its intake port 42 are similarly located in the end housing 14. Except, however, as illustrated the air intake passage 40 and its port 42 are displaced from fuel intake passage 60 and its port 62.

The air intake passage 40 is characterized by the absence of any throttle valve. The fuel-air mixture passage 60 is provided with a conventional carburetor 70 having a fuel supply pipe 72 for supplying fuel (for example, a liquid-type fuel such as gasoline) to the passage 60 in accordance with the magnitude of the air flow through this passage 60 as measured by the venturi 74 in this passage. Unlike the air intake passage 40, the fuel-air mixture passage 60 includes a throttle valve 76 for regulating the quantity of the fuel mixture supplied by the passage 60 to each of the working chambers 28. The carburetor 60 is set to supply a fuel-rich mixture through the passage 60, that is, a mixture having a fuel-air ratio substantially higher than a stoichiometric mixture. However, taking into account the air supplied into the air intake passage 40, the over-all fuel-air ratio in each of the combustion chambers 28 at the time of combustion therein, is relatively lean.

The air intake and fuel-air mixture intake ports 42 and 62 respectively are successively opened and closed to the working chambers 28 as these ports are uncovered and covered by the rotor 18 in response to its planetary-type movement about the shaft 22. The manner in which the rotor 18 controls the intake and exhaust ports opening into the engine cavity is more fully described in the aforementioned prior patents, particularly in U.S. Pat. No. 2,988,065.

The configuration and location of the air intake port 42 and the fuel-air mixture port 62 preferably are such that the air intake port 42 opens first to a working chamber 28 and also closes first to this chamber. For this purpose, the fuel-air mixture intake port 62 is disposed, relative to the clockwise direction of rotation of the rotor, (indicated by an arrow in FIG. 1), in a downstream direction from the intake port 42. In addition, when a peripheral edge of the rotor 18 is about to close the air intake port 42, the fuel-air mixture intake port 62 has its radially outer edge projecting radially outwardly beyond this rotor peripheral edge so that said port 62 is still partially open.

When the rotor 18 is in its full line position of FIG. 1, the air intake port 42 has, as illustrated, been opened slightly to the working chamber 28 then located at the lower portion of FIG. 1. In addition, at this time the intake port 62 is still closed and the exhaust port 44 is about to be closed to this chamber. When the rotor 18 reaches its $a$ position (illustrated) by dot and dash lines in FIG. 1) the fuel-air mixture intake port 62 is about to open to this working chamber 28, the exhaust port 44 now being closed to said working chamber. As also shown in FIG. 1, at this time the fuel-air intake port 62 although still closed is disposed about midway between the leading and trailing portions of said working chamber. When the rotor 18 reaches its $b$ position, (also illustrated by dot and dash lines in FIG. 1) both the air intake port 42 and the fuel-air mixture port 62 are fully open to said working chamber. When, however, the rotor 18 reaches its $c$ position (also illustrated by dot and dash lines in FIG. 1) the air intake port 42 has been closed by the rotor but the fuel-air mixture port 62 is still approximately half open. The fuel-air mixture intake port 62 does not close until the rotor 18 reaches its $d$ position (also illustrated by dot and dash lines in FIG. 1).

As noted, in the $c$ position of the rotor 18, the fuel-air mixture intake port 62 is still partially open to a working chamber 28 but the air intake port 42 is at that time already closed to said working chamber. As illustrated in FIG. 1 the fuel-air mixture intake port 62 is at this time disposed relatively close to the trailing end of said working chamber whereby this fuel is non-symmetrically supplied into each working chamber 28. Thus, because the fuel-air mixture supplied to the intake port 62 is fuel-rich, the result of this late closing of the intake port 62 is that a relatively fuel-rich mixture accumulates at the trailing portion of said working chamber 28 much more so than might result if the fuel and air were supplied in the usual manner through a common intake port.

As the rotor 18 continues to rotate beyond its $d$ position, the volume of the working chamber 28 under consideration decreases to compress its fuel-air charge. When this working chamber 28 reaches the position of the working chamber designated 28$a$ in FIG. 3, its charge has been substantially compressed and the chamber is positioned slightly short of its minimum volume position adjacent to the lobe junction 25. The charge in the chamber 28$a$ is now ready for ignition. For this purpose a spark plug 80 is mounted in the engine housing, preferably in the end housing 14 (as best seen in FIG. 4) so that its electrodes open through the inner wall of this end housing at a point adjacent to the trailing end portion of the chamber 28 when its charge is to be ignited. Thus, the spark plug 80 is energized each time a working chamber 28 reaches the position of the chamber 28$a$ in FIG. 3.

Figure 3:
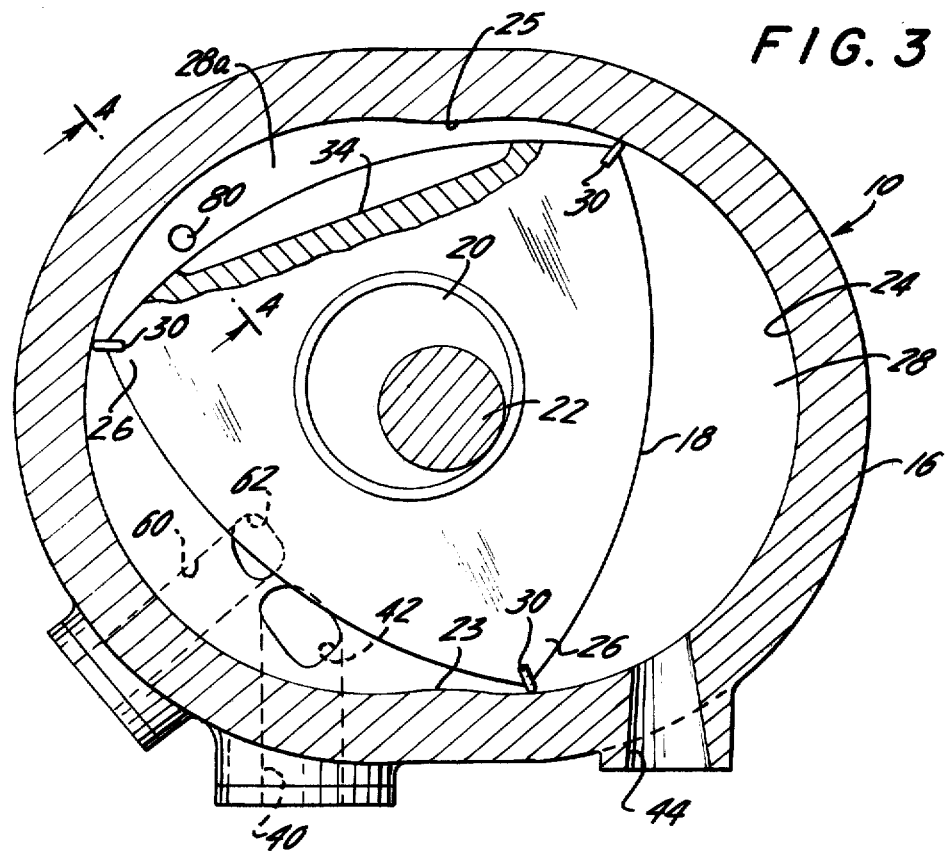
FIG. 3 is a view similar to FIG. 1 but showing the rotor in a different position.
Figure 4:
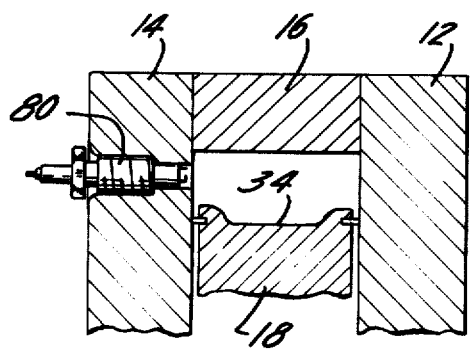
FIG. 4 is a sectional view taken along line 4—4 of FIG. 3.

Because of the inertia of the fuel and because of the short time required for a working chamber to move from a position in which the fuel-air mixture intake port is closed to that chamber and when the chamber reaches the position of chamber 28a in FIG. 3, the trailing portion of this chamber still contains a relatively fuel-rich mixture at the time of ignition. Hence, the spark plug 80 is effective to ignite the charge in each chamber 28 even though the over-all fuel-air ratio in the chamber is quite lean. Additional spark plugs may be provided. For example, a second plug (not shown) could be mounted in the end housing 12 at a point opposite to the spark plug 80 so that both said plugs are effective to ignite the charge in each working chamber 28. Following ignition each working chamber completes its cycle by undergoing its expansion and exhaust phases as more fully described in the aforementioned patents.

It is apparent from the foregoing that the invention provides a rotary engine in which each working chamber 28 is provided with a highly stratified fuel-air mixture. In particular, the trailing portion of each working chamber 28 at the time the charge in the chamber is to be fired, is fuel-rich. In addition, in accordance with the invention, a spark plug is so located that when the plug fires for each working chamber 28 the electrodes of the plug are located adjacent to this fuel-rich trailing portion of said chamber. In this way the invention makes it possible to operate the engine on a fuel-air mixture which over-all is quite lean, too lean to be consistently ignited by a spark plug were the fuel uniformly distributed throughout the chamber.

Operation of the rotary engine on a lean over-all fuel-air ratio not only results in a reduction in the carbon monoxide and unburned hydrocarbons in the engine exhaust but also reduces the NOx in the exhaust emissions and results in lower fuel consumption.

As contrasted with the aforementioned stratified charge rotary engine U.S. Pat. Nos. 3,246,636 and 3,698,364, this invention attains a highly stratified charge in each working chamber 28 without any high pressure fuel injection system as is required when fuel is injected into each working chamber adjacent to the lobe junction 25 as in said prior patents. Instead, as illustrated in FIG. 1, the fuel is introduced by means of a conventional carburetor arrangement.

In lieu of the carburetor 70, it is obvious that the fuel could be supplied by any low pressure fuel injection system into the intake passage 60. Also the two intake ports 42 and 62 could be disposed on opposite end walls 12 and 14 instead of on the same end wall 14 as in FIG. 1. Also the spark plug could be mounted on the rotor housing 16 (for example, as shown in prior U.S. Pat. Nos. 3,722,480 and 2,979,042) radially outwardly from its illustrated position in an end housing. Preferably, however, the spark plug 80 is mounted, as illustrated, in the end housing so that the spark plug discharge hole is covered by each rotor apex portion 26 as the apex portion passes the spark plug hole thereby minimizing the leakage which would otherwise occur between adjacent working chambers if the spark plug were mounted on the rotor housing. This is important because of the high pressure difference which exists across an apex seal as the seal passes the spark plug 80 when, as in the present invention, it is located adjacent the trailing portion of a working chamber 28 at the time the plug is fired.

Also in lieu of providing a second intake passage 60 with its intake port 62, the fuel could be injected directly into each working chamber 28 through a fuel nozzle directed toward the trailing portion of each working chamber at the time of fuel injection. For reasons of economy, however, the carburetor system illustrated is preferred to such a fuel injection system.

The invention clearly is not limited to the specific rotary engine illustrated. For example, the trochoidal surface 24 could have more than two lobes with a number of apex portions 26 on the rotor being correspondingly increased. Such a rotary engine configuration is fully described in the aforementioned U.S. Pat. No. 2,988,065.

It should be understood that this invention is not limited to the specific details of construction and arrangement thereof herein illustrated and that changes and modifications may occur to one skilled in the art without departing from the spirit or scope of the invention.

What is claimed is:

1. A rotary combustion engine comprising:
    a. an outer body having a peripheral wall and axially-spaced side walls defining an internal cavity therebetween and also having first and second intake ports and an exhaust port opening into said cavity with the inner surface of said peripheral wall having a multi-lobe profile;
    b. a shaft coaxial with said outer body cavity and having an eccentric portion;
    c. an inner body of generally polygonal profile journaled on said eccentric portion for relative rotation within said outer body, the apex portions of said inner body having sealing cooperation with said peripheral surface to define a plurality of working chambers which vary in volume in response to said relative rotation and the communication of said ports with said chambers being controlled by said relative rotation;
    d. a passageway for supplying air only through said first intake port into said working chambers,
    e. a passageway for supplying a fuel-rich mixture through said second intake port into said working chambers, and
    f. said two intake ports being so shaped and positioned that the first intake port opens to a working chamber before the second intake port and closes before the second port whereby the trailing portion of each working chamber is supplied with a relatively fuel-rich mixture.

2. A rotary combustion engine as claimed in claim 1 and in which said two intake ports are each formed in a side wall of the outer body with said second intake port having at least a portion disposed circumferentially beyond said first intake port in the direction of inner body rotation relative to the outer body.

3. A rotary combustion engine as claimed in claim 1 in which the passage for the first mentioned intake port is characterized by the absence of any throttle valve.

4. A rotary combustion engine as claimed in claim 1 and including an igniter mounted on the housing at a position so that at the time the igniter is to be energized it is located adjacent to said fuel-rich trailing portion of the adjacent working chamber when said chamber is positioned slightly short of its minimum volume position.

5. A rotary combustion engine as claimed in claim 4 in which the igniter opens into the engine cavity from one of the side walls of the outer body.

* * * * *